United States Patent [19]

Wyner et al.

[11] Patent Number: 5,507,902
[45] Date of Patent: Apr. 16, 1996

[54] MULTI-LAYERED SHEET

[75] Inventors: Daniel M. Wyner, North Scituate, R.I.; Steven I. Wolkenbreit, Amherst, Mass.

[73] Assignee: R.H. Wyner Associates, Inc., West Bridgewater, Mass.

[21] Appl. No.: 263,481

[22] Filed: Jun. 21, 1994

Related U.S. Application Data

[63] Continuation of Ser. No. 904,157, Jun. 25, 1992, abandoned.

[51] Int. Cl.$^6$ ................................ B29C 47/02; B29D 9/00
[52] U.S. Cl. .................. 156/209; 156/244.24; 156/306.3; 264/216; 264/284
[58] Field of Search .............................. 156/230, 244.24, 156/244.25, 244.27, 247, 244.16, 289, 344, 244.23, 246, 249, 209, 244.11, 78, 306.3; 264/46.4, 46.8, 216, 280, 284, 286

[56] References Cited

U.S. PATENT DOCUMENTS

| | | | |
|---|---|---|---|
| 2,321,996 | 6/1943 | Cohen et al. | 156/247 |
| 2,496,349 | 2/1950 | Kellgren et al. | |
| 2,758,045 | 8/1956 | Heaton et al. | 156/244.27 |
| 2,776,451 | 1/1957 | Chavannes | |
| 2,964,866 | 12/1960 | Chamberlin | |
| 3,024,154 | 3/1962 | Singleton et al. | |
| 3,141,913 | 7/1964 | Edwards | |
| 3,170,974 | 2/1965 | Jacobs | |
| 3,179,550 | 4/1965 | Friedman | 156/244.25 |
| 3,187,069 | 6/1965 | Pincus et al. | 264/46.8 |
| 3,258,511 | 6/1966 | McGregor, Jr. | 264/46.4 |
| 3,332,829 | 7/1967 | Avery | |
| 3,346,105 | 10/1967 | Nye et al. | |
| 3,393,106 | 7/1968 | Marrinan et al. | 264/216 |
| 3,434,861 | 3/1969 | Luc | 156/247 |
| 3,533,895 | 10/1970 | Norcross | 264/216 |
| 3,848,037 | 11/1974 | Harper et al. | 264/46.6 |
| 3,892,078 | 7/1975 | Closson | 156/244.16 |
| 3,929,545 | 12/1975 | Van Dyck et al. | 156/247 |
| 4,091,142 | 5/1978 | Elmore et al. | 156/78 |
| 4,370,374 | 1/1983 | Raabe et al. | |
| 4,397,905 | 8/1983 | Dettmer et al. | |
| 4,849,045 | 7/1989 | Schmidt | 156/246 |
| 4,871,407 | 10/1989 | Homma et al. | 428/40 |
| 4,871,506 | 10/1989 | Monlies et al. | |
| 4,983,436 | 1/1991 | Bailey et al. | 428/40 |
| 5,004,635 | 4/1991 | Griebling | 428/40 |
| 5,108,814 | 4/1992 | Harp et al. | 428/523 |
| 5,154,956 | 10/1992 | Fradrich | 428/40 |

OTHER PUBLICATIONS

Killion Equipment and Services Catalog.

*Primary Examiner*—Michael W. Ball
*Assistant Examiner*—Richard Crispino
*Attorney, Agent, or Firm*—Fish & Richardson

[57] ABSTRACT

A multi-layer sheet is formed of a urethane film extruded onto a textured substrate. The film and substrate are pressed together causing the film to adopt the texture of the substrate. The substrate can be peeled away from the film leaving a textured, non-tacky surface.

4 Claims, 4 Drawing Sheets

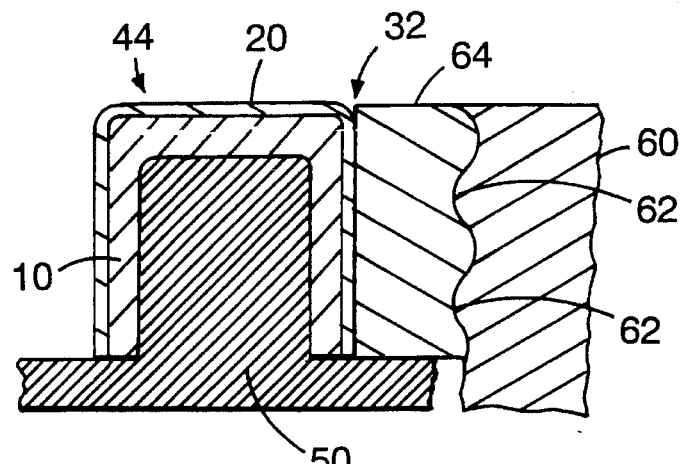
FIG. 5
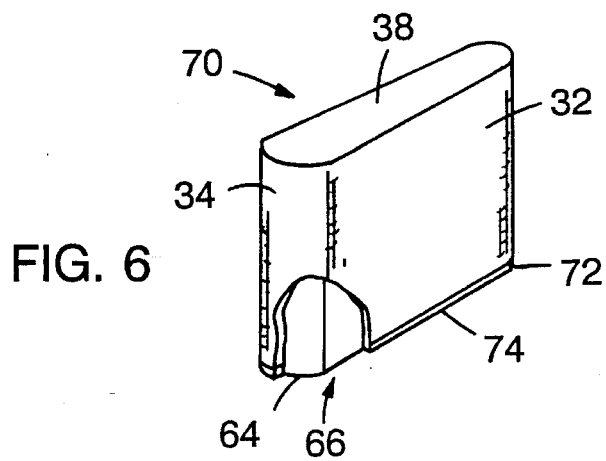
FIG. 6
FIG. 7
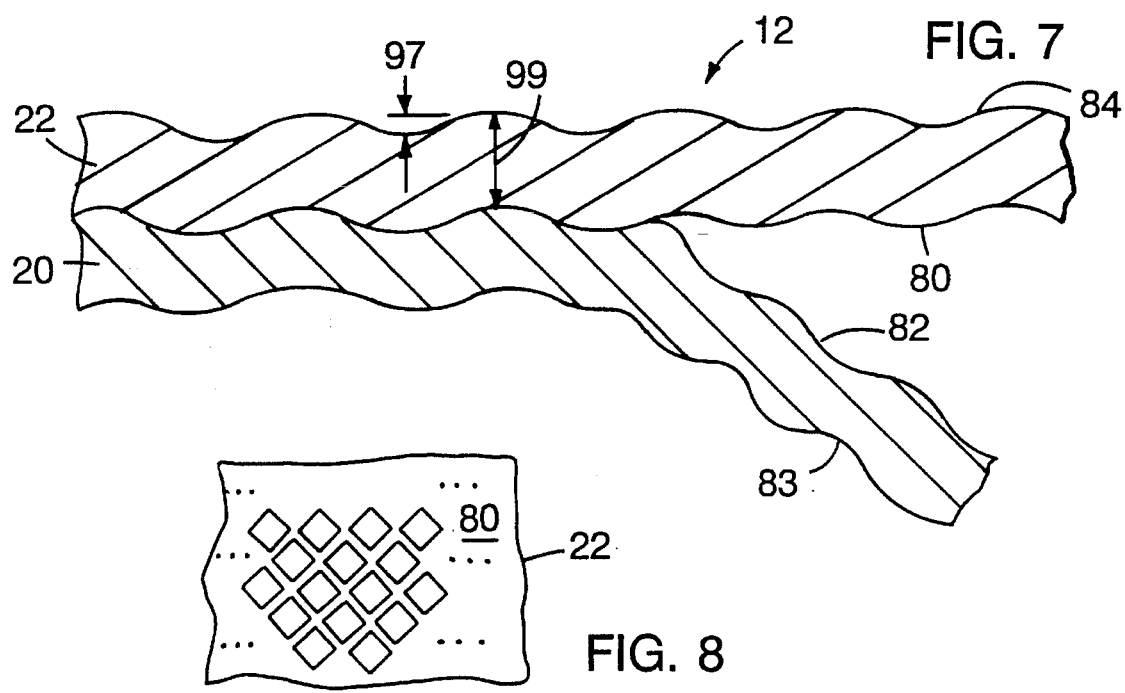
FIG. 8

MULTI-LAYERED SHEET

This is a continuation of application Ser. No. 07/904,157, filed Jun. 25, 1992, now abandoned.

BACKGROUND OF THE INVENTION

This invention relates to multi-layered sheet materials used in making, e.g., foam products.

In making foam automobile seat cushions, for example, a multi-layered sheet is bonded to a finish fabric. The finish fabric is then cut and sewn to form a seat cushion cover for encasing a foamed-in-place pad. Prior to forming the foam pad, the outer layer of the multi-layered sheet is peeled away, exposing an inner film layer. A foaming liquid is then injected into a mold lying adjacent the exposed inner layer. The foam fills the mold and bonds to the film layer to form the foam pad.

One such multi-layered sheet, produced by Atochem in Germany, is manufactured by co-blown extrusion of urethane and polyethylene layers. The urethane and polyethylene layers are extruded through concentric circular dies to produce two cylindrical layers which exit the dies in an upward direction. At a point above where they exit the dies, the two layers are pressed together with nip rolls and flattened into four layers. The edges are split and the four layers are separated into two multi-layer sheets.

SUMMARY OF THE INVENTION

In embodiments of the invention a multi-layer sheet is formed of a urethane film extruded onto a textured polyethylene substrate. The film and substrate are pressed together causing the film to adopt the texture of the substrate. The substrate can be peeled away from the film leaving a textured, non-tacky surface, which offers a number of advantages.

Thus, in general, in one aspect, the invention features pressing together an extruded film and a substrate having a textured surface to form a layered sheet material with the film and the substrate of the layered material being separable.

In embodiments of the invention, the film (e.g., urethane) and the substrate (e.g., polyethylene) are pressed together by passing the film and the substrate between nip rolls while the film is warmer (e.g., as a result of extrusion) than the substrate. The film may have a thickness of about 1 to 4 mils.

In general, in another aspect, the invention features the layered sheet material itself, including a substrate having a textured surface and a film attached to, and conforming to the texture of, the textured surface, the film and the substrate being separable.

In embodiments of the invention, the film is substantially free of lubricants or release agents, is substantially pin-hole free, and comprises a polymer (e.g., urethane). The texture of the textured surface has a depth between about 20% and about 80% of the thickness of an untextured substrate.

In general, in another aspect, the invention features a method for using a multi-layered sheet in a manufacturing process. A multi-layered sheet is bonded to a fabric, the multi-layered sheet comprising a substrate having a textured substrate surface, and a film having a textured film surface which conforms to the textured substrate surface. The bonded sheet and fabric is cut into pieces. And the pieces are sewn together to form a shell of the product.

Embodiments of the invention include the following features. The substrate is removed to expose the textured film surface. A mold is positioned near the shell. A foaming liquid forms a foam which conforms to the mold, and which bonds to the textured film surface. The fabric is on the outside of the shell when the pieces are sewn together. The shell is turned inside out to expose the substrate. The substrate is removed to expose the textured film surface. Prior to the bonding step, the film is extruded and pressed against the substrate, the textured substrate surface facing the film.

In general, in another aspect, the invention features the foam product itself, including a fabric; a film bonded to the fabric, the film having a textured surface; and a foam material bonded to the textured surface of the film.

Embodiments of the invention include the following features. The fabric comprises a cloth portion and a thin foam sheet portion, the film being bonded to the thin foam sheet portion. The film includes urethane, and the foam material includes urethane. The film is pinhole-free and substantially lubricant-free. The product may be a seat cushion, the fabric may include cloth, the foam material may include a foam pad, and the film may include urethane.

The textured surfaces on the urethane film and on the polyethylene (protective) layer provide important advantages. If the protective layer must be peeled back before sewing the multi-layered sheet to pattern pieces of the bonded upholstery, the textured surface of the exposed urethane film, being less glossy and tacky, allows the sewing head to pass more freely over the material. Sewing is also faster in the more typical case, in which the protective layer is not peeled back, because the protective layer also has a textured surface.

In addition, the textured protective polyethylene layer provides more protection against abrasion and damage of the urethane film than does an untextured polyethylene layer. One reason is that the embossed polyethylene layer is more slippery and objects tend to slip over it rather than puncture it. And the textured polyethylene layer is effectively thicker as a result of the process which produces the texture.

During foaming, the liquid foaming chemicals flow evenly over the surface of the textured film, thus preventing voids in the foam pad.

The textured urethane surface has more surface area than a smooth surface and provides more opportunity for three-dimensional bonding of the foam, thus enhancing the bonding strength. The textured urethane surface is elastic, resists cracking and knuckling, and is less susceptible to marks and wrinkles. The textured polyethylene layer is also softer than an untextured layer, making it more appropriate to laminate to delicate fabrics. Untextured polyethylene produces a boardier finish.

The ability of the textured polyethylene to be compacted allows it to absorb distortions caused by gauge bands, thus reducing the overall distortion resulting from the build up of gauge bands.

Other features and advantages will be apparent from the following description and from the claims.

DESCRIPTION

FIG. 5 is a cross-sectional view of the shell and mold of FIG. 4, with another mold, and foam between the molds.

FIG. 6 is a perspective view of the finished automobile seat, partially cut-away.

FIG. 7 is a cross-sectional view of a fragment of the two-layer sheet of FIG. 1.

FIG. 8 is a pictorial representation of a layer of material with textured diamond pattern.

In the invention, a two-layer sheet may be used in making, for example, foam-in-place products such as automobile seat cushions.

Figure 1:
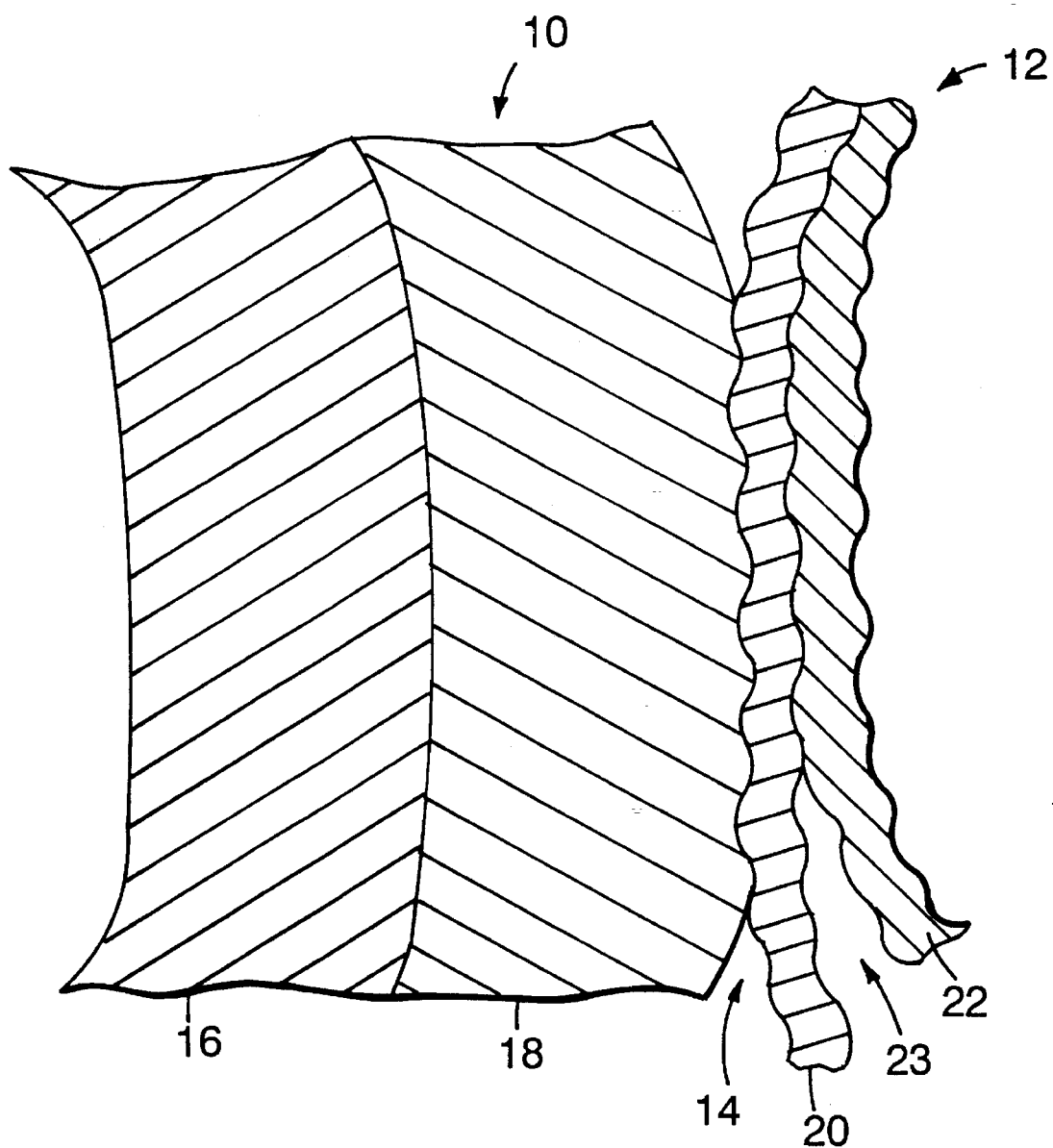
FIG. 1 is a cross-sectional view of a fragment of upholstery material attached to a two-layer sheet.

Referring to FIG. 1, upholstery 10 for an automobile seat cushion is bonded by flame lamination or adhesive lamination to two-layer sheet 12 at interface 14. Upholstery 10 includes a finish fabric 16 bonded to a preformed foam layer 18. Two-layer sheet 12 has a urethane film 20 which is lightly bonded to (but separable from) a polyethylene layer 22. Urethane film 20 is substantially pin-hole free and thus provides an air-tight vacuum barrier and also a liquid foam chemical barrier during the formation of a foam pad for the finished cushion. Polyethylene layer 22 protects the urethane film during preliminary processing stages before the pad is foamed-in-place. The sheet and its layers will be discussed in more detail below.

Figure 2:
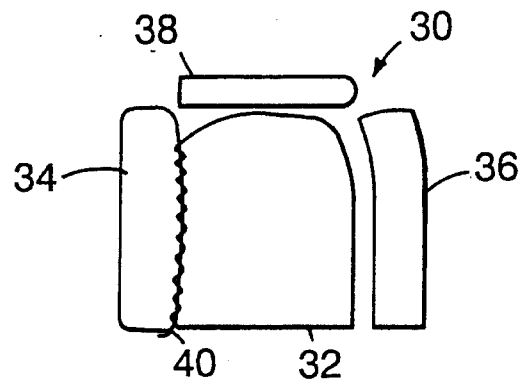
FIG. 2 is a plan view of patterns cut from the material shown in FIG. 1 for making an automobile seat.
Figure 3:
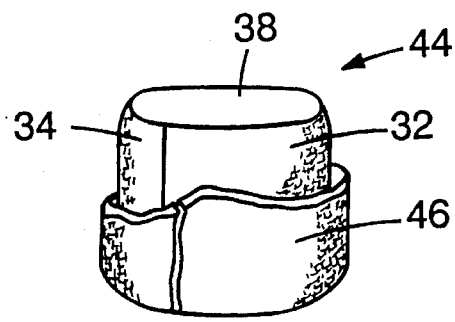
FIG. 3 is a perspective view of a shell of a seat cushion formed of the patterns of FIG. 2 and partially turned inside-out.
Figure 4:
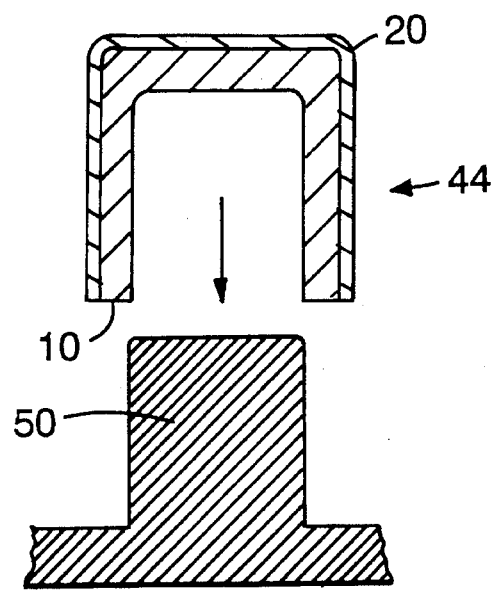
FIG. 4 is a cross-sectional view of the inside-out shell and a mold.

Referring to FIG. 2, to make the seat cushion, pattern pieces 30 are cut from a bolt of the bonded upholstery/two-layer sheet. Pattern pieces 30 include a front piece 32, side pieces 34 and 36, a top piece 38, and a rear piece (not shown). These pieces are sewn together with stitches 40 to form seat cushion shell 44, as shown in FIG. 3. Shell 44 is then turned inside out, FIG. 3, so that surface 46 is exposed on the outside of the shell and the finish fabric is hidden on the inside of the shell. Next, the polyethylene layer 22 is peeled away, leaving urethane film 20 as the exposed material. As shown in FIG. 4, modified shell 44 (not shown to scale) is then positioned over mold 50.

Referring to FIG. 5 (in which the thickness of shell 44 is exaggerated), shell 44 is mounted with front piece 32 facing a second mold 60, at a distance roughly equal to the width of side pieces 34 and 36 (FIG. 2). Liquid chemical foam agents (in the form of a fluid or slurry) are injected into the volume between front piece 32 and mold 60. The agents react to create a foam which increases in volume to fill the cavity. The foam flows over and bonds to the urethane film. The foam then "sets" to become a urethane foam pad 64. Pad 64 has surface detail corresponding to mold detail 62. After shell 44 and attached pad 64 are removed from molds 50 and 60, other components (e.g., plastic or metal parts not shown) can be attached to pad 64.

Referring to FIG. 6, shell 44 is then turned right side out to form a seat cushion 70 having an upholstery covering on a foam pad 64. Detail work for the finished seat, such as vinyl reinforcement 72 at non-stitched end 74, may then be added. Alternatively, the final detail work and vinyl reinforcement may be done before the foaming process.

Referring to FIG. 7, urethane film 20 is formed of urethane resin (e.g., BASF SP806 or other products within the same family of resins, or possibly resins supplied by other vendors), with a constant thickness in the range of about 0.5 to 10 mils, preferably 1 to 3 mils, and most preferably about 2 mils. Because urethane film 20 faces the liquid agents which become the urethane foam pad, film 20 is pinhole-free, even when stretched slightly, and essentially lubricant-free in order to enhance bonding to the foam. Preferably, the film is completely lubricant-free, but it may have small amounts, e.g., less than an aggregate of 2% of impurities such as heat stabilizers or UV stabilizers or other processing additives. Other materials that could be used for the film include polyester, copolyesters, copolyamides, urethane and vinyl alloy, and urethane and thermoplastic rubber alloy. Generically, the materials that would work best would have the properties of being elastic, thermoplastic, pin-hole free, able to adhere to the chemicals or substrates involved in the process, and durable and able to withstand whatever flexing takes place in the ultimate product.

Layer 22 is a low density polyethylene film (such as style 333 taffeta rubber separator sheet, made by Cadillac in Paris, Ill.). The weight-average thickness of the layer should range from 1 to 4 mils, preferably about 2 mils. Alternatively, this layer could be mylar, polyester, Saranex polyvinylidene chloride, or polypropylene. More generally, the protective (substrate) layer should have the following properties: be strong enough (e.g., resistant to punctures and scratches) to provide protection to the urethane film layer; be able to cling to the urethane film layer but be separable from it when cool; be relatively low cost; and have a fairly soft (not boardy) hand.

Polyethylene layer 22 has a textured (e.g., embossed) surface 80, which produces somewhat similar conforming textured surfaces 82, 83 on urethane film 20 when the two layers are pressed together during formation of the sheet. The texture of the substrate has a depth 97 of between about 20% and about 80% of the thickness 99 of the substrate. The texture in surface 82 is evident when the two layers are separated. Referring to FIG. 8, the texture of surface 80 may be an embossed taffeta pattern with about 222 to 444 diamonds per square inch, and preferably about 333 diamonds per square inch. The texture should be sufficient to allow the urethane film to adhere to the protective polyethylene layer. The depth of the texture could be between 20% and 80% of the thickness of the unembossed polyethylene layer. Other geometric or non-geometric patterns could be used, for example squares or hexagons instead of diamonds. The texture need only disrupt the smooth surface of the urethane sufficiently to avoid glossiness and tackiness. The resulting texture on the urethane film may not even be visible. The texture could be achieved by engraving or sand blasting.

Figure 9:
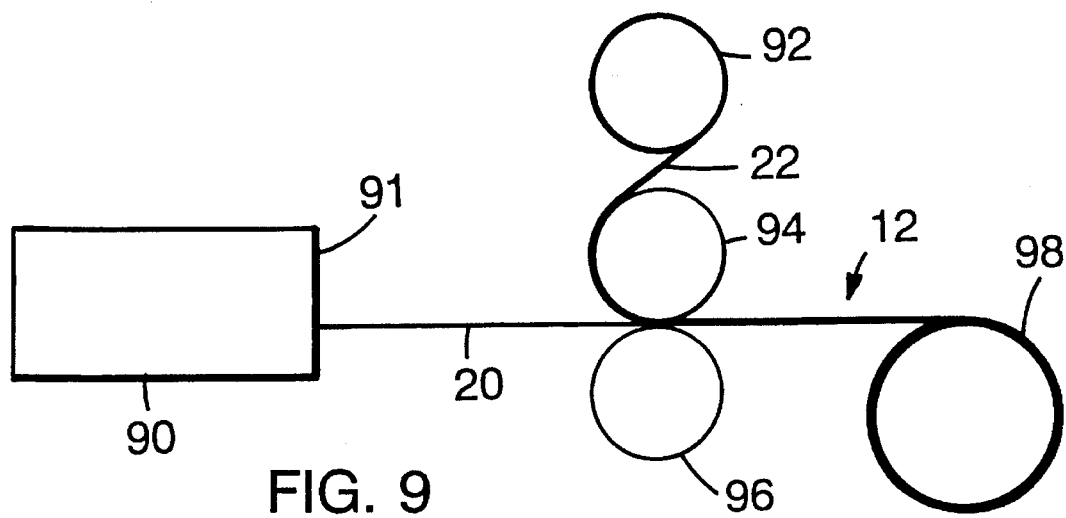
FIG. 9 is a pictorial representation of an extrusion method for making the two-layer sheet.

The urethane film is made by horizontal, or vertical casting, extrusion. The film is extruded onto the polyethylene layer while still thermoplastic. Referring to FIG. 9, extruder 90 melts urethane granules and forms urethane layer 20 by passing the molten urethane through sheet die 91. The thickness of the urethane film is controlled by adjusting the speed of production or varying the die opening. In the sheet die, the urethane is at about 400° F. The polyethylene layer is relatively cool and is fed from a roll 92.

From a position that is near to the sheet die, the two layers are simultaneously pulled by a set of nip rolls, including rubber roll 94 and steel roll 96. Rolls 94 and 96 press the two layers together while the urethane is still relatively warm. The two layers of the resulting sheet are lightly bonded together so that the polyethylene layer can later be peeled. When the two layers are pressed, the texture of the substrate is impressed in the urethane layer. Steel roll 96 may have a mat finish or a simple polytetraflouroethylene release coating. The resulting two-layer sheet 12 is trimmed at the edges and wound on take-up roll 98. The finish on the polyethylene protective film may become somewhat impressed on surface 83 (FIG. 7) of layer 20 during the final wind-up.

Figure 10:
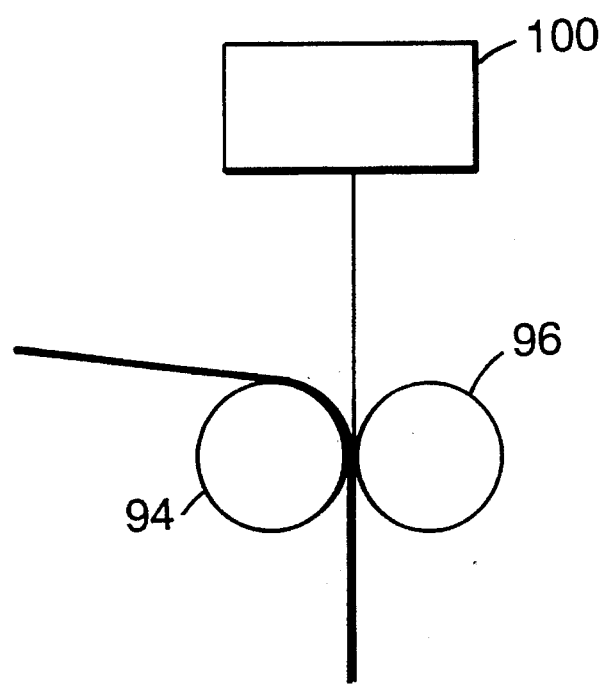
FIG. 10 is a pictorial representation of a casting method for making the two-layer sheet.

Referring to FIG. 10, alternatively, sheet 12 may be produced from a casting die 100. Urethane film 20 is drawn vertically downward, and pressed to the polyethylene layer 22 by calendar rolls 94 and 96.

The textured surfaces of the urethane film and the polyethylene layer provide a number of advantages. The pattern pieces can be sewn more easily when the sewing is done on a polyethylene or urethane surface which is textured. Since the film is hot and the polyethylene is relatively cool when the two are pressed together, if the polyethylene surface were glossy, the urethane film would also be rendered glossy and tacky. It is more difficult for the sewing head to sew over a glossy or tacky surface. The textured surface can produce a three to four times improvement in the speed of sewing compared to a smooth surface.

The textured surface of the urethane film also improves the flow of foam agents over the surface of the film. Compared to a flat surface, the textured surface has greater tooth or roughness. The liquid is also less likely to bead on the surface. As a result, the liquid flows more evenly, substantially preventing voids in the foam pad.

Since the textured surface of the urethane film has more surface area than a flat surface, the urethane foam bonds better to the textured urethane film. The bonds are three-dimensional, rather than two, which causes greater bond strength. The surface also resists cracking and knuckling since it is more elastic and less susceptible to marks and wrinkles when folded or bent. The ability of the textured surface to be compacted allows it to absorb some of the distortions caused by gauge bands and thus reduces the overall distortion resulting from the build up of gauge bands which may occur in flat die extrusion. By contrast, non-textured polyethylene allows the "high" spots to build up more easily. These "hills" stretch on the roll and leave distortions when the film is eventually unwound. Since the embossed polyethylene does not allow these "high" spots to build up, there are no major stretch marks in the film.

Other embodiments are within the following claims. The two-layer sheet can be used in making other kinds of foam products, and in other applications (e.g., molded footwear, and medical products) which require an uncontaminated pin-hole free membrane which is protected in early stages of a process by a removable second protective layer. The substrate need not be a polymer, but could be, for example, paper or a fabric or a non-woven material with an appropriate textured surface.

In the case of molded footwear, the film could be used to injection mold insoles, for example. Medical applications take advantage of the non-tacky, pinhole free surface and of the softness of the embossed protective carrier. In some automotive applications the film is used as a water or air barrier.

What is claimed is:

1. A method for making a layered flexible, sewable material having a protective substrate and a film attached to and peelable from the substrate, comprising:

thermoplastically extruding a 0.5 to 10 mils thick substantially lubricant-free, pinhole-free urethane film with a die;

providing a 1 to 4 mils thick polyethylene protective substrate having a textured surface; and causing said film to conform thermoplastically to and adhere to said textured surface of said substrate to form a textured film surface by pressing said film against said textured surface with rolls to cause said film to adhere to said substrate to form said flexible, sewable layered material in which said film and said substrate remain separable, said pressing being performed after said film is extruded and at a time when said film is warmer than said substrate and is at temperature which renders it thermoplastic, the film not carrying sufficient heat to cause said substrate to melt.

2. The method of claim 1 wherein said film is pressed against said substrate while said film is warm from extrusion.

3. The method of claim 1 wherein said pressing step comprises passing said film and said substrate between nip rolls.

4. The material of claim 1 wherein the texture of said textured surface has a depth between about 20% and about 80% of a thickness of the substrate.

* * * * *

UNITED STATES PATENT AND TRADEMARK OFFICE
CERTIFICATE OF CORRECTION

PATENT NO.   : 5,507,902

DATED        : April 16, 1996

INVENTOR(S)  : Daniel M. Wyner, Steven I. Wolkenbreit

It is certified that error appears in the above-identified patent and that said Letters Patent is hereby corrected as shown below:

Col. 6, line 34, insert --a-- before "temperature".

Col. 6, line 45, "a" should be --the--.

Signed and Sealed this

Twenty-seventh Day of May, 1997

Attest:

BRUCE LEHMAN

*Attesting Officer*     Commissioner of Patents and Trademarks